United States Patent [19]
Janicek

[11] Patent Number: 5,432,933
[45] Date of Patent: Jul. 11, 1995

[54] METHOD OF CANCELING A DB2 THREAD

[75] Inventor: David L. Janicek, Stafford, Tex.

[73] Assignee: BMC Software, Inc., Houston, Tex.

[21] Appl. No.: 970,335

[22] Filed: Oct. 27, 1992

[51] Int. Cl.$^6$ .............................................. G06F 9/46
[52] U.S. Cl. ................................... 395/650; 395/725;
364/DIG. 1; 364/231.4; 364/231.6; 364/281.3;
364/281.5; 364/281.8
[58] Field of Search ................. 395/650, 600, 700, 725

[56] References Cited

U.S. PATENT DOCUMENTS 5,247,675  9/1993  Farrell et al. ......................... 395/650

OTHER PUBLICATIONS

Nguyen, Thuyen, et al., "Advanced Programmer's Guide to OS/2," 1989, pp. 25–31; 46–51; 76–85.
Brian W. Kernighan & Denis M. Richie, "The C Programming Language", Prentice Hall, 1978, pp. 89–142.
Jay Ranade, Mukesh Sehgal, Phyllis Elkind & Joseph Grossman, "DB2 Concepts, Programming, and Design", McGraw-Hill, 1991, pp. 3–43, 245–250.

*Primary Examiner*—Paul V. Kulik
*Attorney, Agent, or Firm*—Arnold, White & Durkee

[57] ABSTRACT

A DB2 thread cancellation method permits operator intervention to terminate a DB2 thread. After the thread to be canceled has been located, a series of one or more SRBs is scheduled to cancel the thread. The basic approach is an iterative one, involving (1) making the thread nondispatchable, i.e., freezing execution of work associated with the thread to prevent such work from making undesirable environmental changes while the thread canceling operation is in progress, (2) testing to ensure that canceling the thread at that moment will not create certain undesirable side effects, primarily in the context of serialization of DB2 resource usage; (3) invoking the DB2 thread cancellation routine; (4) making the thread dispatchable again to permit the cancellation process to begin; (5) receiving a message whether the cancellation request was completed successfully, and (6) returning a status code indicating a successful or unsuccessful cancellation attempt. The foregoing steps are repeated until a success status code is received or until a timeout, i.e., until a specified number of unsuccessful attempts has been made.

2 Claims, 4 Drawing Sheets
Microfiche Appendix Included
(3 microfiche, 215 pages)

| Locate thread to be canceled | | | 3.1 |
|---|---|---|---|
| Is thread running under TCB? | | | 3.2 |
| YES: 3.3 Schedule SRB to change thread dispatchability status to nondispatchable | | NO: Continue | 3.4 |
| Schedule SRB to attempt cancellation | | | 3.5 |
| Build model of DB2 thread parameters | | | 3.6 |
| Is thread terminating already? | | | 3.7 |
| YES: 3.8 Make thread dispatchable, RETURN | | NO: Continue | 3.12 |
| Does thread hold DB2 latch(es)? | | | 3.10 |
| YES: 3.11 Thread busy; make thread dispatchable, repeat from step 3.2 | | NO: Continue | 3.12 |
| Obtain DB2 latches: LMB WRITE, ASCE startup/shutdown, current address space, System Agent | | | 3.13 |
| Does CCB still match thread to be canceled? | | | 3.14 |
| YES: 3.15 Invoke DB2 thread termin. module, make thread dispatchable | | NO: 3.16 Make thread dispatchable, RETURN | |
| Termination successful? | | | 3.17 |
| YES: RETURN  3.18 | | NO: Repeat from step 3.2 | 3.19 |

RETURN

| | |
|---|---|
| Locate thread to be canceled | 3.1 |
| Is thread running under TCB? | 3.2 |
| YES: 3.3 — Schedule SRB to change thread dispatchability status to nondispatchable | NO: Continue 3.4 |
| Schedule SRB to attempt cancellation | 3.5 |
| Build model of DB2 thread parameters | 3.6 |
| Is thread terminating already? | 3.7 |
| YES: 3.8 — Make thread dispatchable, RETURN | NO: Continue 3.12 |
| Does thread hold DB2 latch(es)? | 3.10 |
| YES: 3.11 — Thread busy; make thread dispatchable, repeat from step 3.2 | NO: Continue 3.12 |
| Obtain DB2 latches: LMB WRITE, ASCE startup/ shutdown, current address space, System Agent | 3.13 |
| Does CCB still match thread to be canceled? | 3.14 |
| YES: 3.15 — Invoke DB2 thread termin. module, make thread dispatchable | NO: 3.16 — Make thread dispatchable, RETURN |
| Termination successful? | 3.17 |
| YES: RETURN 3.18 | NO: Repeat from step 3.2 3.19 |

RETURN

FIG. 3

| | |
|---|---|
| START: Initialize control blocks | 4.1 |
| DB2 Release 2.3? | 4.2 |

| YES: 4.3 | NO: 4.4 |
|---|---|
| Set CCB and ROB control block length variables to lengths of CCB and ROB in DB2 Release 2.3 | Set CCB and ROB control block length variables to lengths of CCB and ROB in DB2 Release 2.2 |

| | |
|---|---|
| Program Temporary Fix (PTF) Release? | 4.5 |

| YES: | NO: |
|---|---|
| Set EB length variable to Large  4.6 | Set EB length variable to Small  4.7 |
| Set ACE length variable to Large  4.8 | Set ACE length variable to Small  4.9 |

| | |
|---|---|
| Obtain & initialize ACE_X | 4.10 |
| Initialize EB_X | 4.11 |
| Obtain & initialize ROB_X | 4.12 |
| Obtain & initialize CCB_X | 4.13 |
| Obtain & initialize XSB_X | 4.14 |
| Obtain & initialize STSV_X | 4.15 |
| Obtain & initialize SKB_X | 4.16 |
| RETURN | |

FIG. 4

METHOD OF CANCELING A DB2 THREAD

BACKGROUND OF THE INVENTION

CROSS-REFERENCES

Related Applications: This application is one of four U.S. patent applications being filed simultaneously, all of which are commonly assigned, namely:

Ser. No. 07/970,335, filed Oct. 27, 1992, METHOD OF DYNAMICALLY CANCELING A DB2 THREAD, by David L. Janicek;

Ser. No. 07/970,337, filed Oct. 27, 1992, METHOD OF DYNAMICALLY EXPANDING OR CONTRACTING A DB2 BUFFER POOL, David L. Janicek;

Ser. No. 07/970,334, field Oct. 27, 1992, now abandoned, METHOD OF DYNAMICALLY EXPANDING A DB2 EDM POOL, David L. Janicek;

Ser. No. 07/970,336, filed Oct. 27, 1992, METHOD OF DYNAMICALLY ADDING OR REMOVING DB2 LOGS, by Anouar Jamoussi and David L. Janicek.

Microfiche Appendix: The microfiche appendix to this specification having 3 frames and 215 microfiche contains source code listings of a series of copyrighted computer program routines that are the property of the assignee of this application. Permission is granted to make copies of the appendix and its contents solely in the course of creating facsimile copies of a patent issuing on this application and for no other purpose. All other rights under copyright or similar law are reserved.

Glossary and Bibliography: A general-purpose glossary of certain terms of art and a list of potentially helpful references for further reading are set out as an appendix to the printed specification of this application. References are indicated in the text of the specification in conventional fashion, e.g., "[Smith]" might indicate an article by Smith. Both the glossary and the list of references are intended solely as an aid to understanding the invention and not as limiting the scope of the inventive subject matter defined in the claims.

The Problem of Noncancellable DB2 Threads

This invention relates to the use of database software such as the well-known DATABASE 2 database software distributed by IBM Corporation, commonly referred to colloquially in the art as "DB2." As is well known to those of ordinary skill, generally speaking DB2 operates as a subsystem in a computer system that itself is operating under the IBM MVS operating system software.

The term "thread" has a specific and well-known meaning in the art. DB2's functions are typically accessed by other MVS subsystems via one or more information connections or attachments between DB2 and another MVS subsystem; each such connection is referred to as a thread. See generally [RanSeh] at pages 20-21; see also [RanSeh] at chapter 11, especially pages 245-250, for a discussion of threads between DB2 and a CICS application program.

FIG. 1 provides a convenient (and greatly simplified) illustration of this meaning. As shown in the figure, a timesharing application program labeled "DB2 application," running under IBM's Time Sharing Option (TSO) subsystem, communicates with a user via the IBM VTAM communications management subsystem. The DB2 application in turn can read from and write to a database in DASD data storage by directing requests for services (typically Structured Query Language or SQL requests) to DB2. The thread used for this purpose, shown in FIG. 1 as a simple two-way connection, actually takes the form of a complex set of control blocks by which DB2 and the DB2 application can exchange information about the requests.

DB2 does not provide a user-accessible facility whereby a thread can be selectively terminated, e.g., in the event of a program malfunction. For example, a transaction between an application program and DB2 and making use of the thread can sometimes misbehave, e.g., by getting into an infinite loop, accessing data that was not intended to be accessed, etc. If as commonly happens the thread in question is holding a DB2 latch (i.e., if the thread has exclusive access to a DB2 resource), other threads cannot access the resource and the DB2 installation can be effectively crippled. DB2 does not provide the system administrator a way to intervene to terminate or cancel the thread in such an event.

SUMMARY OF THE INVENTION

A novel DB2 thread cancellation method is described below. After the thread to be canceled has been located, a series of one or more SRBs is scheduled to cancel the thread. As illustrated in FIG. 2, the basic approach is an iterative one, involving (1) making the thread nondispatchable, i.e., freezing execution of work associated with the thread to prevent such work from making undesirable environmental changes while the thread canceling operation is in progress, (2) testing to ensure that canceling the thread at that moment will not create certain undesirable side effects, primarily in the context of serialization of DB2 resource useage; (3) scheduling synchronous execution of an SRB to issue the actual cancellation request to DB2, (4) making the thread dispatchable again so that the scheduled SRB can in fact cancel the thread when that SRB is executed in its turn by MVS, (5) receiving a message whether the cancellation SRB was completed successfully, and (6) returning a status code indicating a successful or unsuccessful cancellation attempt. The steps described above are repeated until a success status code is received or until a timeout, i.e., until a specified number of unsuccessful attempts has been made. The discussion below sets out a more detailed description of particular functions carried out during execution of those steps.

BRIEF DESCRIPTION OF THE DRAWINGS

FIG. 3 is high-level flow chart illustrating the steps of a method of cancelling a DB2 thread in accordance with the invention.

FIG. 4 is a flow chart illustrating the building of a model of certain DB2 environment parameters for the thread in question.

DETAILED DESCRIPTION OF SPECIFIC EMBODIMENTS

Figure 1:
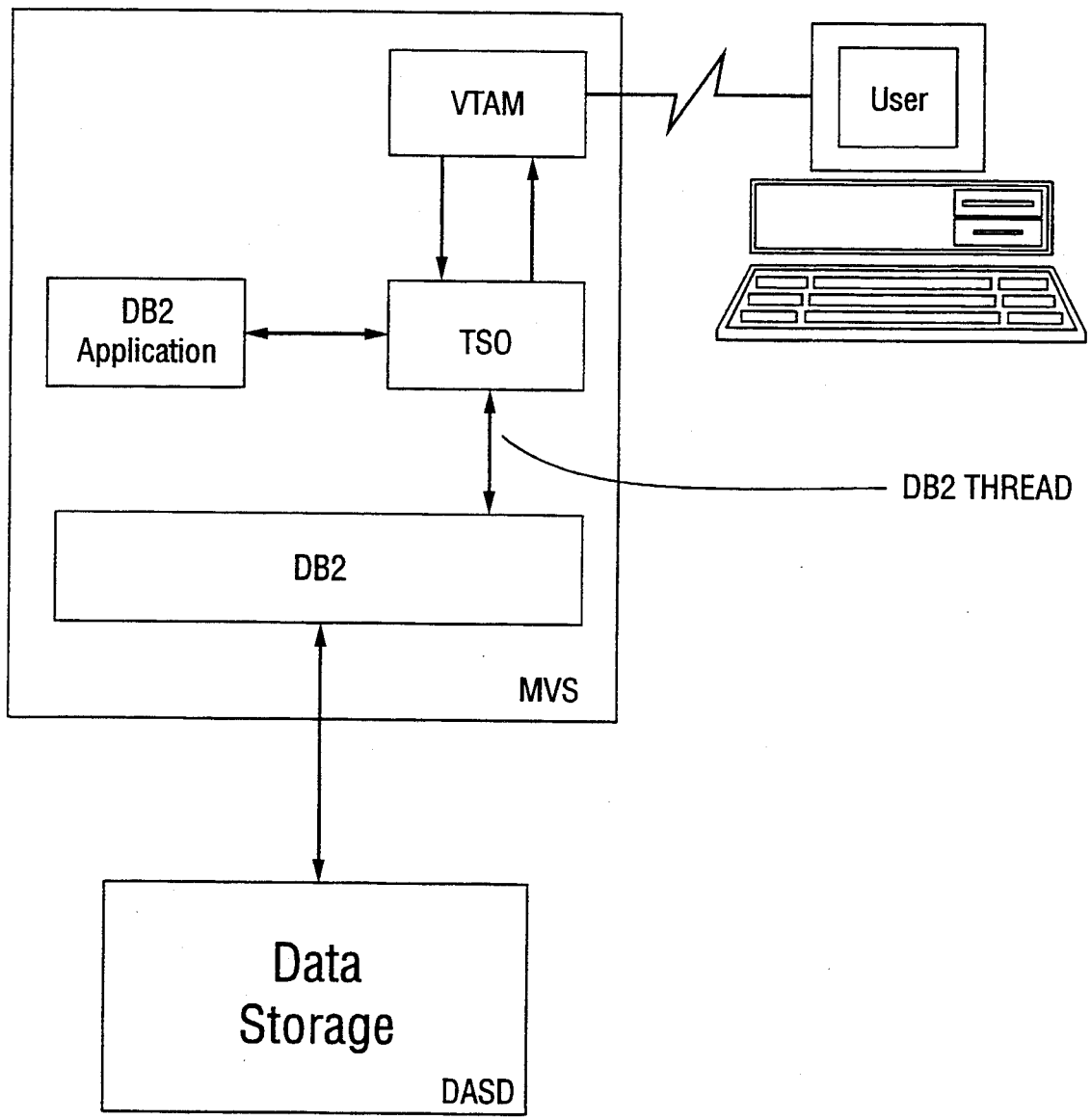
FIG. 1 is a illustration of a possible relationship between DB2 and other MVS subsystems such as TSO and VTAM.
Figure 2:
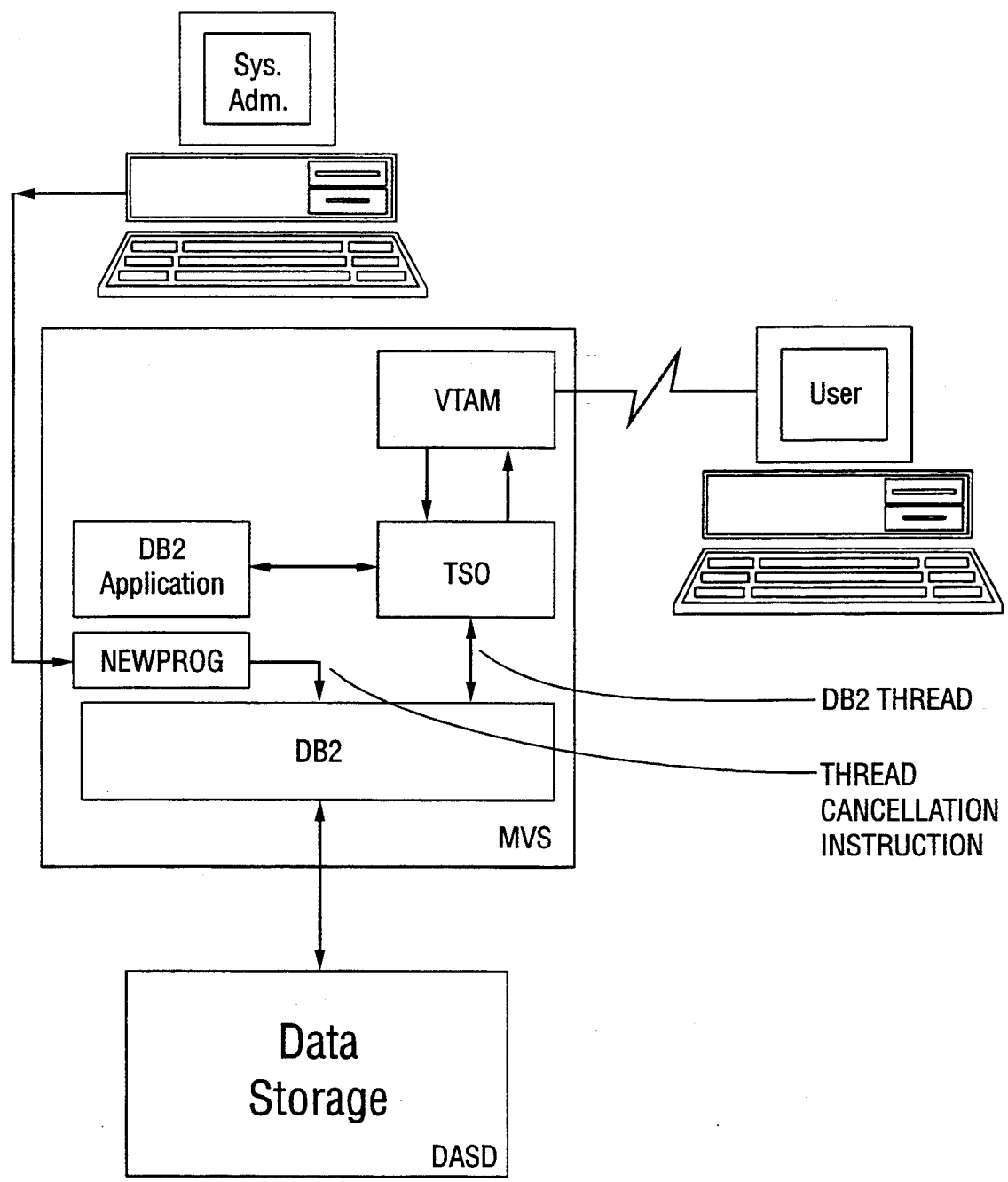
FIG. 2 is a simplified illustration of a similar relationship with the addition of a computer program for canceling a DB2 thread in accordance with the invention.

One illustrative embodiment of a method in accordance with the invention is described below as it might be implemented in a computer program (referred to here for convenience as "NEWPROG"). An actual implementation of such a program might be executable on, e.g., an IBM System 370-compatible machine or equivalent running IBM OS/VS SP2 (MVS/XA), SP3 or SP4 (MVS/ESA) and IBM Database 2 (DB2) version 1.3 or later, or on one or more other suitable computer systems. For purposes of further illustration, the microfiche appendix sets out selected extracts of source code from an actual software package owned and distributed under license by the assignee under the trademark OPERTUNE.

In the interest of clarity, not all features of an actual implementation are described in this specification. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of MVS system program development for those of ordinary skill having the benefit of this disclosure.

Locating the Thread to be Cancelled

As shown in block 3.1 of FIG. 3, a search is performed to locate the CCB control block whose user identification field matches that of the thread to be canceled (and to locate thereby the ACE control block of the thread to be canceled), in accordance with conventional monitor techniques. One approach to performing the search entails iteratively "running the chain" of pointers from the SCOM control block for each ASCE control block whose address is listed in the SCOM. That is, each ASCE pointed to by the SCOM in turn includes a pointer to a VLCA control block. The VLCA control block in turn points to the head of a chain of ACE control blocks. Each ACE includes a pointer to a CCB. If the contents of the CCB's user identification field does not match the user identification of the thread to be cancelled, the search continues. A depth-first search will typically be used, but any convenient search strategy may be employed.

Making the Thread Nondispatchable

As shown in block 3.3 of FIG. 3, the thread to be canceled is made nondispatchable. This step includes testing whether the thread is running under a TCB, i.e., whether the executing thread was initiated on the local MVS system—as opposed to the situation where a "distributed" thread executing on one MVS system was initiated on another MVS system. If the thread is running under a TCB and thus is not a distributed thread, a status change routine is executed by scheduling an SRB in the address space of the thread, i.e., of the DB2 application program, to make the thread nondispatchable. (If the thread is a distributed thread, it need not be made nondispatchable). NEWPROG determines the address space control block ASCB of the thread and the address space in which the thread is executing (with execution of NEWPROG switching into Key 0 for that purpose). If the thread is executing under any of the DB2 address spaces, it follows that the thread is terminating and going through a "rollback," i.e., backing out changes previously made to the database in question.

If the thread is not already terminating, NEWPROG calls the MVS ATSET function. That function allows the scheduled SRB to access data in the NEWPROG address space. NEWPROG schedules an SRB to make the task nondispatchable. To do so, it issues an MVS SET LOCK request to obtain the local lock for the address space of the thread to be canceled. This is done because NEWPROG will run some MVS chains to locate a TCB in the thread's address space; the local lock will serialize these chains to make sure they are intact. A TCB is located so that an IRB can be scheduled onto the TCB; this is done because NEWPROG will schedule an SRB to issue an MVS macro to change the dispatchability of the thread. That requires issuance of an SVC, which as well known to those of ordinary skill cannot be issued by an executing SRB. As a result, the SRB schedules an IRB which in turn will perform the actual work of issuing the MVS macro. To find a TCB that is suitable for running the IRB, a search commences with the TCB whose dispatchability is to be modified.

The search proceeds up the ancestor chain of that TCB to find the first TCB that meets the following criteria: does it have a valid eye catcher, namely the TCB blank characters; are the asynchronous exits of the TCB not suppressed; is the TCB not currently active on a CPU; is the TCB not suspended or interrupted while holding cross-memory lock; and does the TCB either not allow or not have active any enable-unlocked-task (EUT) functional recovery routines (FRRs). If a TCB meeting those criteria cannot be found, NEWPROG terminates the request. That happens rarely because a handful of standard MVS TCBs are normally active, in essence awaiting occurrence of abnormal events, and these TCBs usually meet the criteria. Once a suitable TCB is found, NEWPROG creates an IRB to change the dispatchability of the TCB under which the thread is running by issuing an MVS CIRB macro, then schedules the IRB for execution.

The MVS ATSET function is called again, this time to clear the pointer indicating that the secondary address space of the thread is the NEWPROG address space, in effect disallowing NEWPROG program code instructions from being executed for the thread by DB2.

Attempting to Cancel the Thread

After the initialization steps described above in Sections 4.1 and 4.2 have been completed, NEWPROG schedules the execution, in the DB2 master address space, of an SRB to perform the actual thread-cancellation procedures described below in this Section 4.3.

Building a Model of the DB2 Environment

As illustrated in FIG. 4, NEWPROG performs as a prelude a series of definition and environment-value lookup steps (each of which by itself is conventional), then builds a data structure to emulate certain control blocks used by DB2 to store parameters about the thread. While some of these control blocks are documented in various DB2 information manuals, others are undocumented and had to be determined empirically. The address of the control block SCOM for the DB2 environment being modeled is used as an input; the address of a control block referred to as EB__X, emulating the DB2 control block of the same name for the thread in question, is returned as an output.

Block 4.2: It has been found that different releases of DB2 may make use of CCB and ROB control blocks that are of the same name and general structure but of different lengths. In particular, DB2 releases prior to 2.3 use CCB and ROB control blocks of different lengths than those of release 2.3. Whether the DB2 installation is release 2.3 is tested by a conventional examination of the operating system's DB2 installation information in the DECP control block. Variables containing the lengths of DB2's CCB and ROB control blocks are initialized to the appropriate values depending on whether the DB2 release is 2.3 or earlier.

Block 4.5: If a Program Temporary Fix (PTF) is in effect, the EB and ACE control blocks in DB2 will have different lengths than otherwise. Accordingly, NEWPROG determines whether a PTF is in effect by conventional examination of operating system information, and sets a flag iPTF if so. If the iPTF flag is set, then respective variables defining the length of the EB and ACE control blocks are set to respective Large values, else to respective Small values.

It has been determined empirically that DB2 apparently maintains unique identifying codes for various control blocks such as the ACE control block. Most of those codes may be determined conveniently by "running the chains" of the DB2 control blocks (referring to the documentation of those control blocks in the aforementioned IBM publications) to locate the control block of interest, then calling a dump analysis package such as IPCS distributed by IBM, or the DB2 dump formatting utility such as the program DSNWDMP provided with DB2, to examine the control block and thereby obtain its identifying code.

Block 4.10: An ACE_X control block, for emulating DB2's ACE control block of the same name, is created and initialized by obtaining a segment of free storage (the size or length of which was determined in the steps beginning at block 4.2) with a GETMAIN statement. That storage is obtained from subpool 241; it may be either above or below the 24-bit addressable storage line, and must be in Key 7 storage. Initialization of the ACE_X control block includes determining whether the EB control block for the DB2 installation will have a structure reflecting a DB2 PTF release, by checking whether the iPTF flag is set. Initialization also includes writing (i) the length of the ACE_X control block and (ii) the unique DB2 identifying code of the ACE control block being emulated, into the appropriate locations in the ACE_X control block. Later in the initialization, the address of the EB_X control block will also be recorded in the ACE_X control block.

Block 4.11: Because the ACE control block in DB2 includes the EB control block, initialization of the ACE_X control block also includes setting up an EB_X control block, as part of the ACE_X control block, to emulate the EB control block of DB2, The EB_X control block is initialized by writing to that control block (i) the length of the EB_X, as determined above, (ii) the DB2 identifying code of the EB, (iii) a pointer to the DB2 control block RMVT, (iv) the EB flag A, (v) the EB flag D, (vi) the EB's home ASCE, and (vii) a flag indicating whether the routine running at any particular time is running in the DB2 master address space or in the DB2 data base's address space.

Block 4.12: Similar steps are performed to obtain and initialize a control block ROB_X. Again, a GETMAIN is performed to obtain a block of free Key 7 storage from subpool 241; the length of the block is the variable iROBLEN, determined in block 4.2 as described above. The address of this block of storage, i.e., the new ROB_X control block, is recorded in the ACE_X control block. The ROB_X control block is initialized by recording in it (i) the unique DB2 identifying code of the ROB, (ii) the length of the ROB_X, and (iii) a pointer back to the ACE_X control block. Thus, a chain of pointers has been created from the ACE_X control block to the EB_X control block to the ROB_X control block and back to the ACE_X control block.

Block 4.13: A control block CCB_X is created and initialized in similar fashion. Again, a GETMAIN is performed to obtain a block of free Key 7 storage from subpool 241; the length of the block is the the variable iCCBLEN, determined as described above. The address of this block of storage, i.e., the new CCB_X control block, is recorded in the ACE_X control block. The CCB_X control block is initialized by recording in it (i) the unique DB2 identifying code of the CCB, (ii) the length of the CCB_X, and (iii) in the field corresponding to the user identification field of DB2's CCB control block, an identifier indicating that the user is the Install SYSADM (i.e., the installation system administrator, who by definition has unlimited access privileges in DB2).

Block 4.14: A control block XSB_X, emulating the MVS control block of the same name, is obtained by executing a GETMAIN to obtain a block of free Key 7 storage in subpool 241. The XSB is used by MVS to handle SRBs that are suspended and then later resumed. Storage for XSB_X may be taken from below the 16-meg line to take into account the possibility that some older versions of MVS's SRB dispatcher may assume that the XSB is located in this region of storage. The block of storage for the XSB_X may have a fixed length (i.e., the size of the MVS control block XSB), and therefore the required size of the block need not be determined as it was for the ACE, EB, ROB, and CCB.

Block 4.15: Another GETMAIN is used to obtain storage for an SRB status save area control block STSV_X in Key 7 storage, subpool 241, of fixed length, below the 16-meg line. The STSV_X is initialized to include a pointer to the XSB_X control block; in addition, the address of the STSV_X is saved as a pointer in the EB_X control block.

Block 4.16: A stack storage block SKB_X, to emulate the DB2 control block of the same name, is obtained and initialized. The size of the SKB_X is dependent on whether the release of DB2 is prior to release 2.20. A GETMAIN is issued to obtain a block of free Key 7 storage in subpool 241 below the 16-meg line. The SKB_X is initialized by recording in it (i) the unique DB2 identifying code of the SKB, (ii) the length of the SKB, (iii) a pointer to the EB_X control block, (iv) a "bottom" field indicating the last byte of the SKB_X, (v) an "available" field pointing to an area in the SKB_X that is available for use by application programs, (vi) a pointer to a current segment CSEG that points to itself, and (vii) a counter field that is initialized to a value of 1.

A pointer is returned to the newly built EB_X control block. An emulation or model environment has thus been created wherein the EB_X points to the ROB_X which in turn points to the ACE_X which points back to the EB_X. The EB_X control block also points to the STSV_X which points to the XSB_X and to the EB_X which in turn points to the SKB_X. This environment provides a standard set of control blocks that are useful in calling various specific DB2 routines for execution as discussed below (other control blocks may be built on an as-needed basis).

Checking Whether Thread is Terminating

Returning to block 3.7 of FIG. 3, NEWPROG checks whether the thread to be canceled is already terminating. This may be performed by checking for the absence of a set X'20' bit in the ASCEFLG1 flag byte and X'40' bit in the ASCEFLG2 flag byte in the ASCE control block for the thread in question as well as for the presence of any of the X'4C bits in the ACEFLC flag byte. If any of those flag conditions are met, then it follows that the thread in question is already terminating.

Obtaining DB2 Latches

As shown in block 3.10, NEWPROG checks to determine whether the thread being canceled holds any DB2 latches. This is accomplished by checking whether the EBLTCHLD flag word is non-zero, which would signify that the thread does hold at least one latch. In the illustrative implementation, the thread is not canceled if it holds any latch, but instead a thread-busy signal is generated, whereupon the SRB completes its execution and returns control to the calling module in NEWPROG. If the thread does not hold a latch in a subsequent iteration of the cancellation routine, it may be canceled.

As a further check, the SRB checks whether DB2 is in what is referred to as a "must complete" state. That indicates that DB2 itself is attempting to terminate the thread. In that case as well, a thread-busy signal is returned, causing the SRB to complete its execution and return control to the calling module in NEWPROG.

At that point in time, as shown in block 3.13, the SRB begins obtaining DB2 latches to ensure proper serialization of certain DB2 resource usage, and particularly to ensure that other threads cannot obtain access to some of these resources while the thread in question is being canceled. The LMB WRITE latch is obtained to ensure that no other thread is performing any log updates at the time the thread in question is canceled. The ASCE start-up shut-down latch is obtained to prevent other threads from altering the ASCE chain (the DB2 address space chains). The latch for the current address space is obtained to ensure that no new threads are created in the address space associated with the thread being canceled. The System Agent latch is also obtained.

Invoking the DB2 Cancel Thread Routine

After the latches are obtained as described above, the SRB performs a final check to ensure once again that the thread's CCB control block (which identifies the thread) still matches the specified criteria, as shown in block 3.14. Conceivably, the CCB control block might have been released for the original thread and then rebuilt for another thread in the same location. If the final check is not completed successfully, cancellation is aborted to avoid cancelling the wrong thread; an appropriate return code is generated and the SRB completes its execution and returns control to NEWPROG.

If the final check is successfully completed, at block 3.15 the SRB invokes the cancel entry point of the DB2 module DSNVSR, which performs the actual cancellation of the thread. The parameters passed to the DB2 module, e.g., to identify the thread to be canceled, may conveniently be obtained from the model of the DB2 environment created as discussed in section 4.3(a). The thread is made dispatchable, in the reverse of the steps taken to make it nondispatchable as described above, so that the DB2 module DSNVSR can execute.

After the DB2 module DSNVSR completes its execution, the DB2 latches, obtained as described above, are released. An appropriate return code indicating whether the thread was successfully terminated is set in the CCA_X control block. The SRB then completes its execution and returns control to NEWPROG.

Checking the Return Code

As noted above, the SRB scheduled by NEWPROG in Section 4.3 generates one of several types of return code when it completes its execution. NEWPROG checks the return code so generated.

If the return code indicates that the thread could not be canceled because it was busy, NEWPROG tries again (by scheduling another SRB as described in Section 4.3) unless it times out, i.e., unless a predetermined number of attempts has already been made.

If the return code indicates a failure of some kind, NEWPROG reports the failure and terminates the thread-cancellation request.

If the return code indicates a successful thread cancellation, NEWPROG reports that fact. As shown in block 3.17, if the SRB return code indicates that the thread was successfully canceled, then the four DB2 latches described above are freed; a return code is set in the CCA to indicate that cancellation in this iteration was successful.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

GLOSSARY

The following general-purpose glossary is provided solely as a convenient aid to understanding for readers who may not be familiar with particular terms of art. The inclusion of a term in this Glossary should not be interpreted as necessarily being completely definitive of the meaning of the term, nor as necessarily limiting or expanding the scope of any claim.

16-megabyte line: Term used in some computer systems to denote the upper boundary of the first 16 megabytes of main memory. Sometimes referred to as the 24-bit line (because a sequence of 24 bits can be arranged in on-off combinations to define individual addresses for 16 megabytes of main memory locations).

24-bit line: See 16-megabyte line.

_X: When applied to a name as a suffix, used to identify a control block, a routine, etc., created to emulate (partially or completely) a corresponding control block, routine, etc., of DB2, For example, ACE_X is used to denote a control block created to emulate the DB2 control block ACE.

ACE: A DB2 control block.

Address: The "location" of, e.g., a specific variable in memory, a specific input/output device on an input-/output bus, etc. Typically, the term "location" actually refers to a unique identifier assigned to the variable, device, etc.; operations such as "writing" data to be stored in a particular portion of memory are accomplished by "broadcasting" the data to all portions of memory along with the identifier (address) of the memory portion that should actually receive and store the data.

Address space: An MVS term used to identify a collection of tasks used to perform a set of functions. (Primary address space, secondary address space)

Address space control block: An MVS control block encoding information about, and used to represent, an address space.

Ancestor chain: A chain of TCBs, each created by the previous TCB in the chain. As a hypothetical example, the ancestor chain of TCB-3 might be as follows: TCB-1 creates TCB-2, which in turn creates TCB-3.

API: Acronym for Application Program Interface, in essence a language or set of communications conventions by which an application program and an operating system can transmit work requests, status reports, etc., to each other.

ASCB: Acronym for address space control block.

ASCE: A DB2 control block. An ASCE exists for each address space that has a thread to DB2.

Asynchronous: If a first "agent" such as a process, a machine, etc., issues a request for a second agent to perform some work, the first agent might either suspend its own operations after issuing the request until it receives a report back from the second agent; this is commonly referred to as synchronous processing. Alternatively, the first agent might continue its own operations after issuing the request, often on the assumption that it will be notified when the second agent has completed its work; this is commonly referred to as asynchronous processing.

CCB: A DB2 control block identifying an individual thread.

Code: (a) Instructions for execution by a processor in a computer system. See also Source code, Executable code. (b) In DB2, a unique two-byte identifier assigned to a DB2 control block.

Computer program: A set of statements or instructions used directly or indirectly in a computer in order to bring about a certain result. Depending on the context, a computer program may comprise either or both of source code and executable code.

Control block: A data structure created and/or utilized by a computer program to keep track of information during the program's execution. A control block is roughly analogous to a set of working notes kept by the program. Depending on its design, a program may create, use, and/or discard several control blocks during its execution. See also Structure.

DB2: A common nickname or acronym for the Database 2 software system distributed by International Business Machines Corporation (IBM), extensively documented in various IBM publications such as [DB2DIAG].

EB: Acronym for "event block," a DB2 control block used to track a unit of work in DB2.

EUT: See Enable-Unlocked-Task.

Enable-Unlocked-Task: A task which has no processing restrictions.

Executable code: A series of one or more instructions executable after suitable processing by a computer or other programmable machine, without compilation or assembly.

Field: A defined part of a data record or data structure; roughly equivalent to a variable. For example, in a data base of employee information, the field "EmployeeName" in the data record for a given employee would be set to that employee's name. See also Control Block, Structure, Variable.

Flag: Typically, a true-false indicator as to some specified condition, or an "option A/option B" indicator.

FRR: See functional recovery routine.

Functional recovery routine: In the IBM MVS operating system, an error handling routine which can be used to recover from and/or obtain information about unanticipated program execution errors.

Initialize: (a) With respect to a variable, setting the variable to a specified value; (b) with respect to a routine, establishing initial conditions for execution of the routine.

INSTALL SYSADM: Used to denote DB2 installation system administrator; signifies the highest level of user/operator privilege in a DB2 installation.

Key 7 storage: Memory or other storage in a computer system whose contents can be altered only if the requestor possesses the appropriate "key," in this case Key 7.

Latch: In DB2, a flag or token used to serialize access to a shared resource. A DB2 thread that has been given exclusive access to such a resource is said to "hold the latch" for that resource. Associated with each thread is an EBLTCHLD flag word in storage that is used as a bit map of latches held by the thread.

Local lock: In the IBM MVS operating system, the lock is a mechanism to serialize the use of a particular shared resource. A call to the MVS function SETLOCK by a process causes MVS to attempt to obtain access to the resource for the process. If the resource is available, then the requesting process is "given the lock." If the resource is not available, i.e., if another process already has the lock, then the requesting process is suspended until the other process gives up the lock, indicating that its use of the shared resource is complete for the time being.

Maintenance release: A release of a computer program or software system that corrects actual problems with the program or system or that provides code for handling potential problems, typically problems discovered since the issuance of the previous release. Maintenance releases sometimes include additional capability or functionality for the computer program. See also PTF, Release.

Module: A portion of a computer program; sometimes referred to as a routine or a subroutine depending on the context.

MVS: IBM's MVS operating system, extensively documented in various IBM publications such as [MVSXA].

Operating system program: A computer program that manages some or all of a computer system and its hardware.

Pointer: A variable whose value is set to the address of, e.g., a memory location. For example, in some situations a particular field in a control block might be defined to be a pointer to another control block. A useful general introduction to pointers can be found in Chapter 5 of [K&R].

Primary address space: The default address space in which access to data and instructions is to be performed.

Processor system: A central processing unit (CPU) and one or more co-processors (e.g., math or graphics co-processors) associated with the CPU.

PTF: Acronym for "Program Temporary Fix," typically a computer program maintenance release that is not given a separate release number. See also Maintenance Release.

Record: In a database, a single set of formatted data. For example, in a database of employee information, a record might constitute all information about a given employee that is kept in that database. Data in a record is commonly divided into fields. See also Field, Structure.

Release: In the software industry, the term "release" typically refers to a (usually numbered) version of a computer program or software system distributed to licensees. Release numbering often takes the form "major.minor," e.g., release 1.0 signifies the first major release of a program that is distributed to licensees, while release 1.1 signifies the first minor release of that first major release. See also Maintenance release.

RMVT: A DB2 control block.

ROB: A DB2 control block.

Routine: A portion of a computer program; sometimes referred to as a subroutine or a module depending on the context.

Running the chains: Colloquial expression used to describe following a chain of pointers to arrive at an Nth data structure, i.e., examining a first data structure to obtain the address of a second data structure; examining the second data structure to obtain the address of a third data structure; and so forth.

SCOM: A DB2 control block.

Secondary address space: An address space used by some CPU instructions to access data.

SETLOCK: An MVS macro instruction; see "local lock."

Source code: A series of instructions or statements in an English-like high-level computer language such as FORTRAN, C, PASCAL, or LISP, or in a relatively low-level language such as the assembly language for a particular processor. Source code is normally readily readable by humans trained in the particular computer language in question. It is normally transformed by an interpreter or compiler into machine-readable executable code for actual use on a computer.

SRB: Acronym for Service Request Block. In the MVS operating system, one way in which an application program can request that work be performed by MVS is to create an SRB—a formatted control block defining the work request in conformance with the MVS API—and to pass the address of the SRB to MVS with a request to perform the work specified in the SRB. See also API, TCB.

Status Save Area: An MVS control block.

Structure: As defined in [K&R], "a collection of one or more variables, possibly of different types, grouped together under a single name for convenient handling. (Structures are called 'records' in some languages, notably Pascal.)" A useful introductory discussion of structures is set out in [K&R] chapter 6. See also Control Block.

Subpool: An identification code used to group or associate different blocks of storage.

Subroutine: A portion of a computer program; sometimes referred to as a routine or a module depending on the context.

Synchronous: See "asynchronous."

SYSADM: Acronym for System Administrator.

System variable: A variable defined and maintained by an operating system program.

TCB: Acronym for Task Control Block, an MVS control block.

Thread: In DB2, an information connection or attachment between DB2 and another MVS subsystem utilizing DB2's services. DB2 keeps track of each thread through the use of various control blocks such as the ACE.

Timeout: Temporary or permanent cessation of a process, subroutine, etc., upon the occurrence of an event such as the passage of a specified period of time, the performance of a certain number of repetitions of a process, and the like.

Variable: A location in memory associated with a particular identifier and set to a particular value by a computer program, e.g., by an application program or an operating-system program. For example, a computer program for processing employee payroll information might define a variable EmployeeName that, at a particular time, is set to the value "Smith."

XSB: An MVS control block; used to handle SRBs that are suspended and later resumed.

BIBLIOGRAPHY

The following bibliography is included for convenient reference.

[K&R] Brian W. Kernighan & Dennis M. Richie, The C Programming Language (Prentice Hall 1978).

[DB2DIAG] IBM Database 2, Version 2, Diagnosis Guide and Reference, manual no. LY27-9536.

[MVSXA] MVS Extended Architecture Debugging Handbook, Manual #LC28-1169 (IBM).

[RanSeh] Jay Ranade, Mukesh Sehgal, Phyllis Elkind, & Joseph Grossman, DB2 Concepts, Programming, and Design (McGraw-Hill, Inc., 1991).

What is claimed is:

1. A method of canceling a DB2 thread in response to an operator command, comprising the steps of:
    (a) locating the thread to be canceled;
    (b) making the thread nondispatchable;
    (c) obtaining a set of DB2 latches including a LMB WRITE latch, an ASCE startup latch, an ASCE shutdown latch, a current address space latch, and a System Agent latch;
    (d) invoking a DB2 thread termination module;
    (e) releasing said set of DB2 latches; and
    (f) making the thread dispatchable.

2. A method of canceling a DB2 thread in response to an operator command, comprising the steps of:
    (a) locating the thread to be canceled;
    (b) making the thread nondispatchable by determining whether the thread is associated with a task control block (TCB) and if so, scheduling a service request block (SRB) to set the thread's dispatchability status to nondispatchable,
    (c) determining whether the thread is in the process of terminating and if so, setting the thread's dispatchability status to dispatchable and terminating execution of the method;
    (d) obtaining a set of DB2 latches including a LMB WRITE latch, an ASCE startup latch, an ASCE shutdown latch, a current address space latch, and a System Agent latch;
    (e) invoking a DB2 thread termination module;
    (f) releasing said set of DB2 latches;
    (g) setting the thread's dispatchability status to dispatchable;
    (h) receiving a completion report from the SRB specifying whether the thread was successfully terminated; and
    (i) if the completion report indicates that the thread was not successfully terminated, and if steps (b) through (h) have not been repeated a specified number of times, then repeating steps (b) through (h).

* * * * *